US012810114B2

United States Patent
(12) United States Patent
Syngal et al.

(10) Patent No.: US 12,810,114 B2
(45) Date of Patent: Nov. 24, 2026

(54) ARTIFICIAL INTELLIGENCE BASED METHODS AND SYSTEMS FOR IMPROVING CLASSIFICATION OF EDGE CASES

(71) Applicant: MASTERCARD INTERNATIONAL INCORPORATED, Purchase, NY (US)

(72) Inventors: Sonali Syngal, Gurgaon (IN); Debasmita Das, Kolkata (IN); Soumyadeep Ghosh, Kolkata (IN); Yatin Katyal, Rohtak (IN); Kandukuri Karthik, Nalgonda (IN); Ankur Saraswat, Gurgaon (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 1199 days.

(21) Appl. No.: 17/746,661

(22) Filed: May 17, 2022

(65) Prior Publication Data

US 2022/0374684 A1 Nov. 24, 2022

(30) Foreign Application Priority Data

May 18, 2021 (IN) ............................ 202141022309

(51) Int. Cl.
*G06N 3/045* (2023.01)
*G06N 3/0455* (2023.01)
(Continued)

(52) U.S. Cl.
CPC ........... *G06N 3/045* (2023.01); *G06N 3/0455* (2023.01); *G06N 3/0895* (2023.01); *G06V 10/7753* (2022.01); *G06V 10/82* (2022.01)

(58) Field of Classification Search
CPC .... G06N 3/045; G06N 3/0455; G06N 3/0895; G06N 3/0442; G06N 3/0464;
(Continued)

(56) References Cited

U.S. PATENT DOCUMENTS 10,614,361 B2 4/2020 Chung et al.
2016/0155136 A1 6/2016 Zhang et al.
(Continued)

FOREIGN PATENT DOCUMENTS

CN 109543727 A 3/2019

OTHER PUBLICATIONS

Samet Akcay et al., "GANomaly: Semi-supervised Anomaly Detection via Adversarial Training", May 29, 2019, ACCV 2018, https://doi.org/10.1007/978-3-030-20893-6_39 (Year: 2019).*
(Continued)

*Primary Examiner* — Omar F Fernandez Rivas
(74) *Attorney, Agent, or Firm* — Jordan IP Law, LLC

(57) ABSTRACT

Embodiments provide electronic methods and systems for improving edge case classifications. The method performed by a server system includes accessing an input sample dataset including first labeled training data associated with a first class, and second labeled training data associated with a second class, from a database. Method includes executing training of a first autoencoder and a second autoencoder based on the first and second labeled training data, respectively. Method includes providing the first and second labeled training data along with unlabeled training data accessed from the database to the first and second autoencoders. Method includes calculating a common loss function based on a combination of a first reconstruction error associated with the first autoencoder and a second reconstruction error associated with the second autoencoder. Method includes fine-tuning the first autoencoder and the second autoencoder based on the common loss function.

18 Claims, 9 Drawing Sheets

(51) Int. Cl.
*G06N 3/0895* (2023.01)
*G06V 10/774* (2022.01)
*G06V 10/82* (2022.01)

(58) Field of Classification Search
CPC .......... G06N 3/048; G06N 3/084; G06N 3/09; G06V 10/7753; G06V 10/82; G06V 10/764
See application file for complete search history.

(56) References Cited

U.S. PATENT DOCUMENTS

| | | | | |
|---|---|---|---|---|
| 2018/0165554 | A1 | 6/2018 | Zhang et al. | |
| 2019/0096038 | A1* | 3/2019 | El-Khamy | G06N 3/045 |
| 2019/0129819 | A1* | 5/2019 | Guo | G06F 11/263 |
| 2019/0179896 | A1* | 6/2019 | Anisimovich | G06F 18/217 |
| 2019/0205733 | A1* | 7/2019 | Ghaeini | G06F 18/24 |
| 2021/0142177 | A1* | 5/2021 | Mallya | G06N 3/084 |
| 2022/0148241 | A1* | 5/2022 | Park | G06T 11/00 |
| 2022/0300823 | A1* | 9/2022 | Liang | G06N 3/045 |
| 2023/0252270 | A1* | 8/2023 | Lim | G06N 3/084 706/15 |

OTHER PUBLICATIONS

Zhengying Chen et al., "Detecting abnormal behaviors in surveillance videos based on fuzzy clustering and multiple Auto-Encoders", Aug. 6, 2015, IEEE, DOI: 10.1109/ICME.2015.7177459 (Year: 2015).*

Baruch Epstein et al., "Joint auto-encoders: a flexible multi-task learning framework", May 30, 2017, arXiv:1705.10494v1 (Year: 2017).*

Jie Liu et al., "Semi-supervised anomaly detection with dual prototypes autoencoder for industrial surface inspection", Jan. 2021, ScienceDirect, https://doi.org/10.1016/j.optlaseng.2020.106324 (Year: 2021).*

Boyang Liu et al., "RCA: A Deep Collaborative Autoencoder Approach for Anomaly Detection", Aug. 2021, IJCAI, doi: 10.24963/ijcai.2021/208 (Year: 2021).*

Philip Sperl et al., "A3: Activation Anomaly Analysis", Apr. 7, 2020, arXiv:2003.01801v3 (Year: 2020).*

Ensen Wu et al., "Dual Autoencoders Generative Adversarial Network for Imbalanced Classification Problem", May 28, 2020, IEEE, doi: 10.1109/ACCESS.2020.2994327 (Year: 2020).*

Ayman Alazizi et al., "Dual Sequential Variational Autoencoders for Fraud Detection", IDA 2020, LNCS 12080, pp. 14-26.

Enkhtogtokh Togootogtokh et al., "Deep Learning Approach for Very Similar Objects Recognition Application on Chihuahua and Muffin Problem", arXiv, Jan. 2018, 8 pages.

Inseok Hwang et al., "SimEx: Express Prediction of Inter-Dataset Similarity by a Fleet of Autoencoders", arXiv, Jan. 14, 2020, 12 pages.

Martin Johan Langkvist et al., "Learning Feature Representations with a Cost-Relevant Sparse Autoencoder", International Journal of Neural Systems, Nov. 2014, 12 pages.

Wing W. Y. Ng et al., "Dual Autoencoders Features for Imbalance Classification Problem", Pattern Recognition El Sevier, Jun. 2016, pp. 875-889, vol. 60.

Kai Tian et al., "Learning Competitive and Discriminative Reconstructions for Anomaly Detection", 33rd AAAI Conference on Artificial Intelligence, 2019, pp. 5167-5174.

Yan Xia et al., "Learning Discriminative Reconstructions for Unsupervised Outlier Removal", pp. 1511-1519.

Xu Yang et al., "Deep Spectral Clustering using Dual Autoencoder Network", IEEE/CVF Conference on Computer Vision and Pattern Recognition, Apr. 30, 2019, pp. 4061-4070.

* cited by examiner

ARTIFICIAL INTELLIGENCE BASED METHODS AND SYSTEMS FOR IMPROVING CLASSIFICATION OF EDGE CASES

CROSS-REFERENCE TO RELATED APPLICATIONS

The present application claims priority to India patent application No. 202141022309 (filed on May 18, 2021), which is hereby incorporated by reference in its entirety.

TECHNICAL FIELD

The present disclosure relates to artificial intelligence processing systems and, more particularly to, electronic methods and complex processing systems for improving edge case classifications.

BACKGROUND

In machine learning, classification refers to a prediction model where a class, to which a data point belongs to, is predicted. Examples of classification problems include: giving an e-mail, classifying if it is spam or not. A classification model tries to draw some conclusion from the input values given for training. The classification model predicts the class labels/categories to which a newly given input data belongs.

However, sometimes, machine learning models may not be able to correctly classify in cases that have similar attributes to more than one class. Such cases are referred to as 'edge cases'. When the edge cases are provided to the classification model, the classification model may be able to classify the data points into different classes since they look very similar. The classification model typically gives a mid-probability for such edge cases due to highly similar cases or label noise in the training data.

To give a higher probability for the edge cases, the classification model needs to be over-trained and may not generalize well. The generalization refers to capability of the classification model to adapt to new unlabeled data that is previously unseen, and drawn from the same dataset that was used to train the classification model. Hence, the overtraining of the classification model makes the process time-consuming and computationally complex.

Thus, there exists a technological need for a technical solution for a classification model that can classify edge cases with high accuracy and minimal training epoch requirements.

SUMMARY

Various embodiments of the present disclosure provide systems and methods for classifying edge cases of two or more classes by utilizing multiple neural network models (e.g., autoencoder).

In an embodiment, a computer-implemented method is disclosed. The computer-implemented method performed by a server system includes accessing an input sample dataset from a database. The input sample dataset may include first labeled training data associated with a first class and a second labeled training data associated with a second class. The computer-implemented method includes executing training of a first autoencoder and a second autoencoder based, at least in part, on the first and second labeled training data associated with the first class and the second class, respectively. The computer-implemented method includes providing the first and second labeled training data along with unlabeled training data to the first autoencoder and the second autoencoder. The computer-implemented method includes calculating a common loss function based, at least in part, on a combination of a first reconstruction error associated with the first autoencoder and a second reconstruction error associated with the second autoencoder. The computer-implemented method includes fine-tuning the first autoencoder and the second autoencoder based, at least in part, on the common loss function.

BRIEF DESCRIPTION OF THE FIGURES

For a more complete understanding of example embodiments of the present technology, reference is now made to the following descriptions taken in connection with the accompanying drawings in which.

Figure 1:
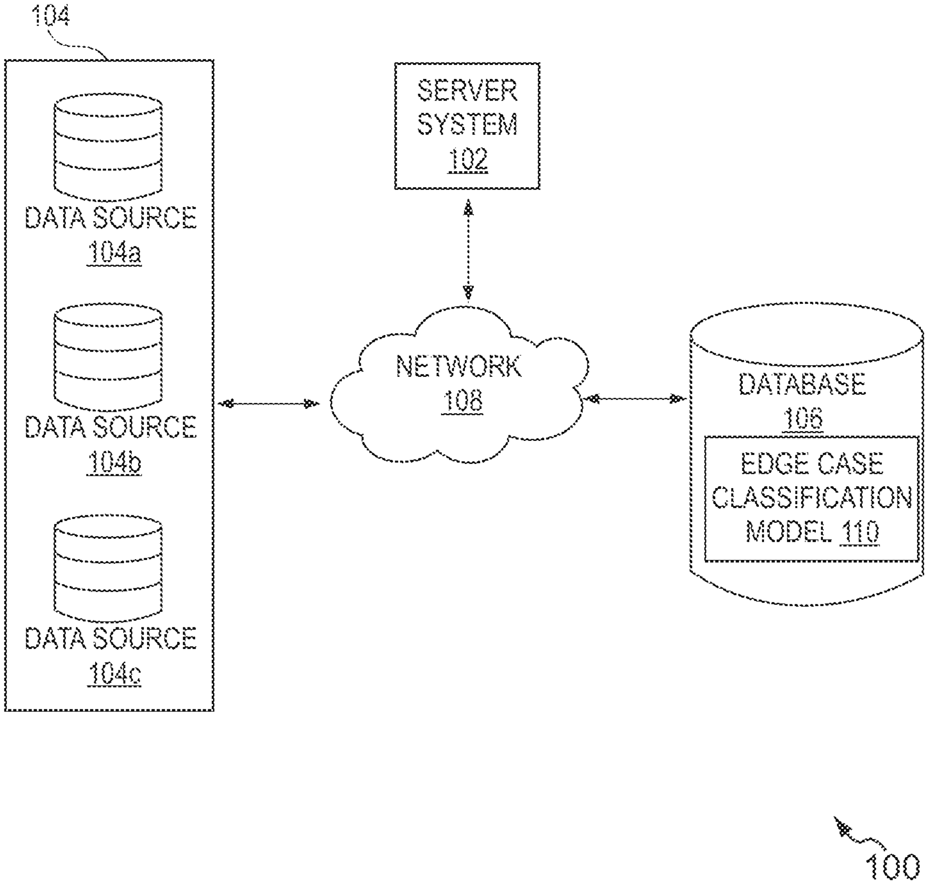
FIG. 1 is an example representation of an environment, related to at least some example embodiments of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

The term “data sources”, used throughout the description, refers to devices, databases, cloud storages, or server systems that are capable of generating/sending data associated with various components incorporated in them. The data sources may transmit data to a server system or any external device that can be used to train various models and further detect anomaly, predict next occurrence, etc., based on the training.

The terms “edge cases” or “highly similar cases”, used throughout the description, refer to data points which look similar but belong to different classes and are not easy to classify using existing classification models.

OVERVIEW

Semi-supervised learning aims to improve the performance of supervised approaches by leveraging both unlabeled and labeled data. There have been some limited attempts to use deep learning for semi-supervised classification tasks, (e.g., using convolutional neural networks (“CNNs”) and/or long short-term memory networks (“LSTMs”)) to learn embeddings from labeled training data and then utilize these embeddings for supervised classification. While such efforts may alleviate some error in classification tasks, however there still remains a technical limitation (e.g., these methods are not able to classify edge cases and are unable to learn discriminatory features of the classes from both unlabeled and labeled data jointly) for the semi-supervised learning.

Further, utilization of the deep metric learning models also does not solve the technical problem because the deep metric learning models learn a single embedding space using a single model which could not be able to differentiate the edge cases.

In view of the foregoing, various example embodiments of the present disclosure provide methods, systems, user devices, and computer program products for classifying highly similar cases using multi-embedding based discriminative learning approach.

Various example embodiments of the present disclosure provide methods, systems, user devices, and computer program products for facilitating classification of highly similar cases (i.e., the edge cases). The edge cases may be present in a dataset including data points from a plurality of classes. Various embodiments disclosed herein provide methods and systems to utilize a classification model capable of classifying edge case scenarios in a multiclass dataset. In particular, the classification model may be trained to classify between two classes at once. Similarly, the classification model may be trained for all the possible combinations of two classes from multiclass dataset. The classification model is configured to utilize two or more autoencoders to enable edge case classification. The classification model is configured to train the two or more autoencoders based on labeled dataset and then try to force these autoencoders to learn hidden attributes of different classes by back-propagating them on unlabeled data with a common loss function that tries to maximize difference in reconstruction errors for every pair of autoencoders associated with dual similar classes.

In various example embodiments, the present disclosure describes a server system that is configured to access an input sample dataset from a database. The input sample dataset may include first labeled training data associated with the first class and second labeled training data associated with the second class. The input sample dataset may be received from one or more data sources such as a database associated with a server. The server system is configured to pre-process the input sample dataset so that the data is divided into first labeled training data, second labeled training data and unlabeled training data. The first labeled training data includes all the data points belonging to first class and the second labeled training data includes all the data points belonging to a second class. The unlabeled training data may include data points that are unlabeled, or in other words, the class to which these data points belong is not defined.

In one embodiment, the server system is configured to execute training of a first autoencoder and the second autoencoder. During the training process, the first autoencoder is trained using the first labeled training data and the second autoencoder is trained using the second labeled training data. In one example, the first and second autoencoders may include neural network models such as LSTM model, CNN model, and the like. In particular, the training process causes the first autoencoder to learn all the features of the first class and the second autoencoder to learn all the features of the second class. The features refer to the attributes that can be used to classify a data point belonging to that class. In other words, the first autoencoder is configured to learn data characteristics of the first class and the second autoencoder is configured to learn data characteristics of the second class. After the training process, optimized neural network parameters are obtained and the first and the second autoencoders may be initialized with the optimized neural network parameters.

After the training process, the first and the second autoencoders are fine-tuned using the first and second labeled training data along with the unlabeled training data. At first, as mentioned above, the first and second autoencoders are initialized with optimized neural network parameters during the fine-tuning process. Further, some layers such as the first encoder and second encoder layers of the first and second autoencoders may be frozen during the fine-tuning process. Freezing some layers of the autoencoders ensures that those layers will not be affected by the fine-tuning process and the features that were learnt by those layers during the training process will not be lost.

In one embodiment, the server system is configured to provide first and second labeled training data along with the unlabeled training data to the first and second autoencoders. The fine-tuning process is performed to maximize the difference in learning between the first and second autoencoders such that the edge cases can be classified correctly. In particular, the first and the second autoencoders compete with each other to learn data characteristics that differentiate the edge cases. In one example, if a data point is reconstructed by the first autoencoder, the server system is configured to force the second autoencoder to not reconstruct that data point. Thus, the fine-tuning process enables forcing each autoencoder to learn representation well for only one class and allows the first and second autoencoders to learn from the unlabeled training data without supervision. The provision of the unlabeled training data during the fine-tuning process enables the autoencoders to learn some more attributes regarding the first and second classes that were not learnt during the training phase.

Further, during the fine-tuning process, the server system is configured to determine a first reconstruction error based on the output of the first autoencoder and a second reconstruction error based on the output of the second autoencoder. In one embodiment, the server system is configured to calculate a common loss function based at least on a combination of the first reconstruction error and the second reconstruction error. In particular, the common loss function is defined as a difference between reconstruction errors of the first autoencoder and the second autoencoder. The server system is then configured to train the first autoencoder and the second autoencoder based on the common loss function through a back-propagation.

The common loss function facilitates training of the first and second autoencoders with an objective of diverging reconstruction abilities of the first and second autoencoders. In other words, the common loss function updates weights and biases of the first autoencoder and the second autoencoder in such a way so that both the first and second autoencoders compete with each other.

Once the autoencoders are trained and fine-tuned, the autoencoders may be utilized to classify an unseen data point into the first or second class. During an execution phase, the server system is configured to receive an unlabeled data. The unlabeled data may be new and unseen by the first and the second autoencoders. The unlabeled data is fed to both the autoencoders. The first autoencoder reconstructs the unlabeled data with a first reconstruction error and the second autoencoder reconstructs the unlabeled data with a second reconstruction error. The server system is configured to compare both the reconstruction errors with one or more threshold reconstruction errors and classify the unlabeled data either into the first class and the second class.

Various embodiments of the present disclosure offer multiple advantages and technical effects. For instance, the present disclosure enables edge case classification without overtraining in the semi-supervised manner. The present disclosure provides improved classification results by training and fine-tuning two or more autoencoders, each of the autoencoders configured to learn characteristics of one class.

In binary classification, the two autoencoders enable differential learning such that if one autoencoder learns characteristics of one class, the other autoencoders is forced to unlearn the characteristics associated with that class. Further, during the fine-tuning process, the autoencoders are fed with unlabeled training data. Providing unlabeled training data ensures that some of the hidden characteristics associated with the first and the second classes are learnt by the respective autoencoders. Fine-tuning is a process that requires very less epochs that can save a lot of time and computing effort when compared to overtraining the classification model. Furthermore, the results of the described technology increase the accuracy of the classification model and reduce the number of false positives by a considerable percentage.

Additionally, the present disclosure provides significantly more robust solutions because of handling simultaneous/concurrent processor execution (such as, applying the first and second autoencoders to the same input simultaneously to classify the edge cases).

Various example embodiments of the present disclosure are described hereinafter with reference to FIGS. 1 to 8.

FIG. 1 illustrates an exemplary representation of an environment 100 related to at least some example embodiments of the present disclosure. Although the environment 100 is presented in one arrangement, other embodiments may include the parts of the environment 100 (or other parts) arranged otherwise depending on, for example, improving multi-class classification system for highly similar data. More particularly, the present disclosure learns hidden attributes of each different class and classifies edge cases without overtraining, in a semi-supervised manner. The environment 100 generally includes a server system 102, a plurality of data sources 104*a*, 104*b*, and 104*c*, and a database 106 each coupled to, and in communication with (and/or with access to) a network 108. The plurality of data sources 104*a*, 104*b*, and 104*c* hereinafter is collectively represented as "data sources 104". The network 108 may include, without limitation, a light fidelity (Li-Fi) network, a local area network (LAN), a wide area network (WAN), a metropolitan area network (MAN), a satellite network, the Internet, a fiber-optic network, a coaxial cable network, an infrared (IR) network, a radio frequency (RF) network, a virtual network, and/or another suitable public and/or private network capable of supporting communication among two or more of the parts or users illustrated in FIG. 1, or any combination thereof.

Various entities in the environment 100 may connect to the network 108 in accordance with various wired and wireless communication protocols, such as Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, or any combination thereof. The network 108 may include, without limitation, a local area network (LAN), a wide area network (WAN) (e.g., the Internet), a mobile network, a virtual network, and/or another suitable public and/or private network capable of supporting communication among two or more of the entities illustrated in FIG. 1, or any combination thereof. For example, the network 108 may include multiple different networks, such as a private network made accessible by the server system 102 to the data sources 104 and the database 106 and separately, a public network (e.g., the Internet) through which the server system 102, the data sources 104, and the database 106 may communicate.

In one example, the data sources 104 may be network servers, data storage servers, web servers, interface/gateway servers, application servers, a cloud server, databases of such servers, cloud storage devices, etc. The data sources 104 can also be a component of a larger system, such as a data center that centralizes enterprise computing resources. The data from the data sources 104 may be the data recorded by the data sources 104 in real-time or the data that have been stored in the databases.

In one embodiment, the data sources 104 store multi-class dataset of an item. The data sources 104 may receive the multi-class dataset of the item from a plurality of entities. The multi-class dataset may include data points which can be classified into multiple different classes.

The server system 102 includes a processor and a memory. The server system 102 is configured to perform one or more of the operations described herein. In general, the server system 102 is configured to construct an edge case classification model 110 that classifies edge cases in efficient manner. The edge case classification model 110 enables multi-class classification of highly similar looking data with minimal difference in efficient manner. The server system 102 is configured to classify edge cases using multi-embedding based discriminate learning approaches. The server system 102 is configured to utilize multiple discriminative neural network models (i.e., multiple discriminative embeddings), where each neural network model corresponds to a class which has lots of edge cases. Hence, the server system 102 is configured to train a particular neural network model for each class.

In one scenario, the server system 102 is configured to identify a set of classes that are prone to having more edge cases i.e., the set of classes that have very similar properties. The server system 102 is configured to train multiple neural network models corresponding to the set of classes in discriminate learning approach so that the edge cases can be classified in efficient manner.

For the sake of simplicity, the present disclosure is described in view of binary classification system in which the edge cases can be associated with two classes. However, similar approach can be extended to multi-class classification system for classifying edge cases.

In one embodiment, the server system 102 is a separate part of the environment 100, and may operate apart from (but still in communication with, for example, via the network 108) the plurality of data sources 104*a*, 104*b*, 104*c*, and the database 106 (and access data to perform the various operations described herein). However, in other embodiments, the server system 102 may actually be incorporated, in whole or in part, into one or more parts of the environment 100. In addition, the server system 102 should be understood to be embodied in at least one computing device in communication with the network 108, which may be specifically configured, via executable instructions, to perform as described herein, and/or embodied in at least one non-transitory computer-readable media.

The number and arrangement of systems, devices, and/or networks shown in FIG. 1 are provided as an example. There may be additional systems, devices, and/or networks; fewer systems, devices, and/or networks; different systems, devices, and/or networks, and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally, or alternatively, a set of systems (e.g., one or more systems) or a set of devices (e.g., one or more devices) of the environment 100 may perform one or more functions described as being performed by another set of systems or another set of devices of the environment 100.

Figure 2:
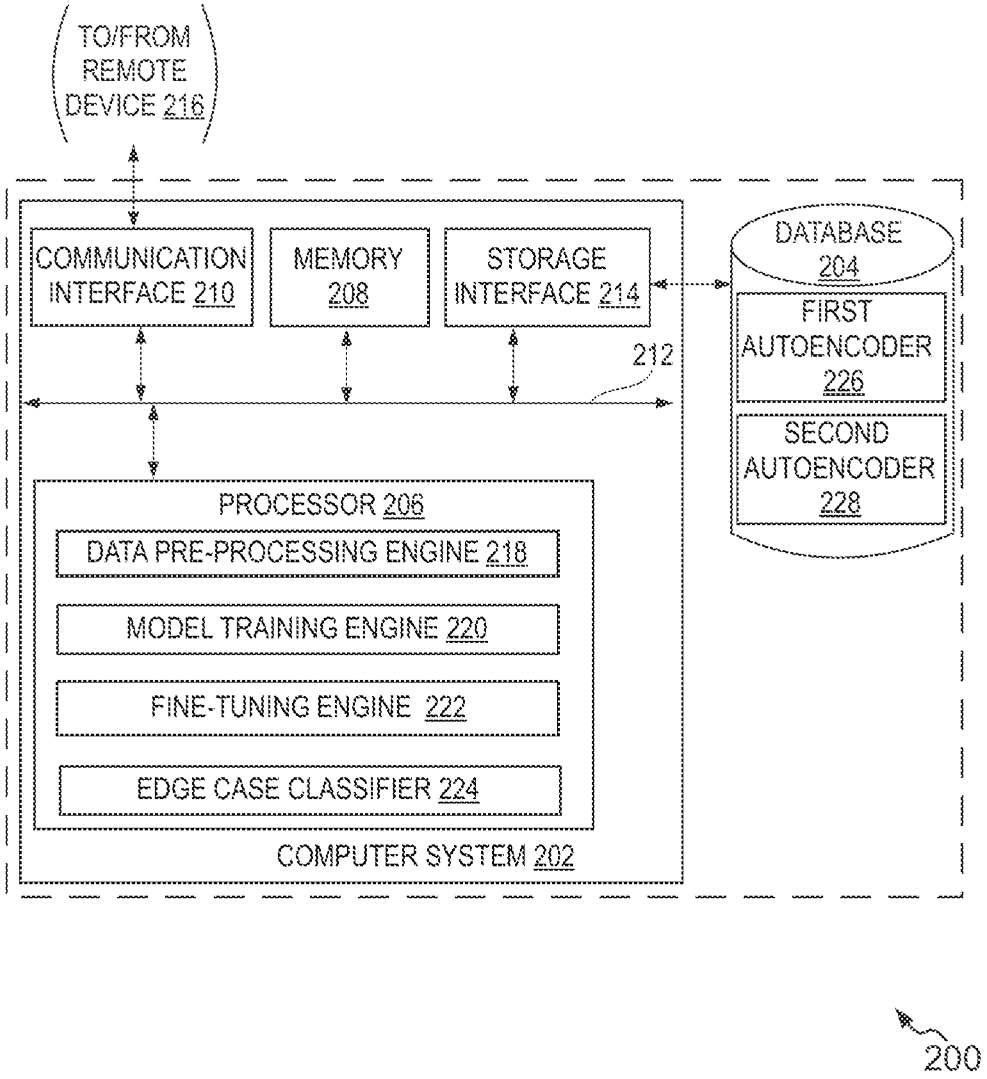
FIG. 2 is a simplified block diagram of a server system, in accordance with an embodiment of the present disclosure.

Referring now to FIG. 2, a simplified block diagram of a server system 200, is shown, in accordance with an embodiment of the present disclosure. For example, the server system 200 is similar to the server system 102 as described in FIG. 1. In some embodiments, the server system 200 is embodied as a cloud-based and/or SaaS-based (software as a service) architecture. In one embodiment, the server system 200 includes a computer system 202 and a database 204.

The computer system 202 includes at least one processor 206 for executing instructions, a memory 208, and a communication interface 210. The one or more components of the computer system 202 communicate with each other via a bus 212.

In one embodiment, the database 204 is integrated within the computer system 202. For example, the computer system 202 may include one or more hard disk drives as the database 204. A storage interface 214 is any component capable of providing the processor 206 with access to the database 204. The storage interface 214 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 206 with access to the database 204. In one embodiment, the database 204 is configured to store neural network models associated with autoencoders, where each autoencoder is configured to learn data features of a single class.

The processor 206 includes suitable logic, circuitry, and/or interfaces to execute computer-readable instructions for classifying highly similar cases using multi-embedding based discriminate learning approaches. In other words, the processor 206 is configured to utilize multiple discriminative neural network models (i.e., multiple discriminative embeddings), where each neural network model corresponds to a class which has lots of edge cases. The discriminative learning approach leads to improve classification for edge cases by utilizing multiple neural network models trained in discriminative manner.

Examples of the processor 206 include, but are not limited to, an application-specific integrated circuit (ASIC) processor, a reduced instruction set computing (RISC) processor, a complex instruction set computing (CISC) processor, a field-programmable gate array (FPGA), and the like. The memory 208 includes suitable logic, circuitry, and/or interfaces to store a set of computer-readable instructions for performing operations. Examples of the memory 208 include a random-access memory (RAM), a read-only memory (ROM), a removable storage drive, a hard disk drive (HDD), and the like. It will be apparent to a person skilled in the art that the scope of the disclosure is not limited to realizing the memory 208 in the server system 200, as described herein. In some embodiments, the memory 208 may be realized in the form of a database server or a cloud storage working in conjunction with the server system 200, without deviating from the scope of the present disclosure.

The processor 206 is operatively coupled to the communication interface 210 such that the processor 206 is capable of communicating with a remote device 216 such as, data sources 104, or with any entity connected to the network 108 (e.g., as shown in FIG. 1).

It is noted that the server system 200 as illustrated and hereinafter described is merely illustrative of an apparatus that could benefit from embodiments of the present disclosure and, therefore, should not be taken to limit the scope of the present disclosure. It is noted that the server system 200 may include fewer or more components than those depicted in FIG. 2.

In one embodiment, the processor 206 includes a data pre-processing engine 218, a model training engine 220, a fine-tuning engine 222, and an edge case classifier 224. It should be noted that the components, described herein, can be configured in a variety of ways, including electronic circuitries, digital arithmetic and logic blocks, and memory systems in combination with software, firmware, and embedded technologies.

In one embodiment, the processor 206 is configured to perform classification for classes which are prone to having more edge cases i.e., the classes that have very similar properties. The processor 206 is configured to learn data features for only those classes, thereby addressing scalability issues.

The data pre-processing engine 218 includes suitable logic and/or interfaces for accessing training datasets from the data sources 104. The training dataset may include a set of unlabeled and labeled data belonging to two or more classes. The labeled data refers to training datasets that are associated with a tag such as a name, a number, or an identifier. Inversely, the unlabeled data refers to training datasets that are not associated with any tag or label.

In one embodiment, the data pre-processing engine 218 is configured to access an input sample dataset from a database (such as, the data sources 104). The input sample dataset may include labeled and unlabeled training data belonging to two classes (e.g., C1 and C2). In one example, the data pre-processing engine 218 is configured to split labeled data of the input sample dataset into first labeled training data ($LD_{C1}$) of a first class (e.g., C1), and second labeled training data ($LD_{C2}$) of a second class (e.g., C2). In one embodiment, the data pre-processing engine 218 may split the labeled subset of the input sample dataset into the training data set and validation data set. The data pre-processing engine 218 may randomly partition the labeled data of the first class and the second class into k equal sized subsets, one of which is then utilized as the validation data set, and the remaining k−1 compose the training data set.

The data pre-processing engine 218 may perform a suitable data pre-processing technique based on the type of data present in the dataset. The data pre-processing techniques may include feature aggregation, feature sampling, dimensionality reduction, feature encoding, data splitting, and the like. In one example, the data pre-processing engine 218 is configured to remove all the special characters and numbers from the dataset and convert the data into lowercase. The data is further clustered into a plurality of clusters by running a 2-step word2vec followed by K-Nearest neighbors clustering. This process of data pre-processing results in the quantification of the data points in the dataset along with cluster numbers.

Similarly, the data pre-processing engine 218 may adopt suitable data pre-processing techniques based on the dataset received from the data sources 104. The dataset may include categorical data, numerical data, image data and the like. The data pre-processing engine 218 is configured to quantify the dataset by utilizing suitable techniques based on the type of data present in the dataset.

In one embodiment, the model training engine 220 includes suitable logic and/or interfaces for training first and second neural network models such as the first autoencoder 226 and the second autoencoder 228, separately. The first autoencoder 226 is trained based on the first labeled training data ($LD_{C1}$) of the first class (e.g., C1). In similar manner, the second autoencoder 228 is trained based on the second labeled training data ($LD_{C2}$) of the second class (e.g., C2). In other words, the first autoencoder 226 is configured to learn data characteristics or attributes of the first class and the second autoencoder 228 is configured to learn data characteristics or attributes of the second class.

The model training engine 220 may use supervised learning methods such as teacher forcing method to train the first autoencoder 226 and the second autoencoder 228.

In general, autoencoders are a type of deep neural network models that can be used to reduce data dimensionality. Deep neural network models are composed of many layers of neural units, and in autoencoders, every pair of adjacent layers forms a full bipartite graph of connectivity. The layers of an autoencoder collectively create an hourglass figure where the input layer is large and subsequent layer sizes reduce in size until the center-most layer is reached. From there until the output layer, layer sizes expand back to the original input size.

Data passed into the first and second autoencoders experiences a reduction in dimensionality. With each reduction, the first and second autoencoders summarize the data as a set of features. With each dimensionality reduction, the features become increasingly abstract. (A familiar analogy is image data: originally an image is a collection of pixels, which can first be summarized as a collection of edges, then as a collection of surfaces formed by those edges, then a collection of objects formed by those surfaces, etc.). At the center-most layer, the dimensionality is at a minimum. From there, the neural network reconstructs the original data from the abstract features and compares the reconstruction result against the original data. Based on the error between the two, the neural network uses back-propagation to adjust its weights to minimize the reconstruction error. When the reconstruction error is low, one can be confident that the feature set found in the center-most layer of the autoencoder still carries important information that accurately represents the original data despite the reduced dimensionality. The weights and the activation function parameters can be modified by the learning process.

Thus, the first autoencoder 226 is initialized with first neural network parameters (such as, weights and biases) and the second autoencoder 228 is initialized with second neural network parameters after the training process.

The fine-tuning engine 222 is configured to update or fine-tune the first autoencoder 226 and the second autoencoder 228 by providing first and second labeled training data ($LD_{C1}$ and $LD_{C2}$) and unlabeled training data (which may be either associated with the first class and the second class) to both the first and second autoencoders. The main objective of the fine-tuning process is to maximize difference in learning between the first and second autoencoders such that the edge cases can be classified correctly. In particular, the first autoencoder 226 and the second autoencoder 228 compete with each other to learn characteristics that differentiate the edge cases. In one example, when an input dataset is reconstructed by the first autoencoder 226, the fine-tuning engine 222 forces the second autoencoder 228 to not reconstruct the input dataset. Thus, the fine-tuning engine 222 is configured to force each autoencoder to learn representation well for only one class and allows the first and second autoencoders to learn from the unlabeled training data without supervision. Further, the provision of the unlabeled training data to the first autoencoder and the second autoencoder facilitates training of the first autoencoder 226 and the second autoencoder 228 in a discriminative manner to learn data characteristics associated with the unlabeled training data.

As described above, the model training engine 220 is configured to train the first autoencoder 226 for learning data features of the first class C1 using the first labeled training data $LD_{C1}$ of the first class C1 and train the second autoencoder 228 for learning data features of the second class C2 using the second labeled training data $LD_{C2}$ of the second class C2.

In the fine-tuning process, the first autoencoder 226 and the second autoencoder 228 are provided with first and second labeled training data ($LD_{C1}$ and $LD_{C2}$) and unlabeled training data. The fine-tuning engine 222 is configured to determine a first reconstruction error RE1 based on the output of the first autoencoder 226 and a second reconstruction error RE2 based on the output of the second autoencoder 228.

The fine-tuning engine 222 is configured to compute a common loss function based at least on a combination of the first reconstruction error $RE_1$ and the second reconstruction error $RE_2$. In particular, the common loss function is defined as a difference between reconstruction errors of the first autoencoder 226 and the second autoencoder 228 i.e., $|RE_1-RE_2|$. The fine-tuning engine 222 is then configured to train the first autoencoder 226 and the second autoencoder 228 based on the common loss function through a back-propagation. In particular, the fine-tuning engine 222 is configured to refine first neural network parameters of the first autoencoder 226 and the second neural network parameters of the second autoencoder 228 based on the common loss function through the back-propagation such that the difference between $RE_1$ and $RE_2$ is maximized.

The common loss function is configured to train the first autoencoder 226 and the second autoencoder 228 with an objective of diverging reconstruction abilities of the first and second autoencoders. In other words, the common loss function updates weights and biases of the first autoencoder 226 and the second autoencoder 228 in such a way so that both the autoencoders compete each other.

In one example embodiment, the common loss function can be negative of the difference between categorical cross entropies of predictions from the first autoencoder 226 and the second autoencoder 228. In another example embodiment, the common loss function can be a negative of the difference of summation of predicted probability of correct classes of predictions from the first autoencoder 226 and the second autoencoder 228.

The fine-tuning engine 222 is configured to run number of epochs (iterations) of the fine-tuning process until a stopping criterion is met. One epoch consists the steps of providing unlabeled or labeled training data, computing the common loss function and adjusting neural network parameters of the first and second autoencoders to minimize the common loss function. A stopping criterion may be achieved when a threshold value is reached corresponding to the common loss function or when the common loss function remains unchanged for two or more epochs. This ensures that the distance between the reconstruction errors of the first autoencoder 226 and the second autoencoder 228 is maximized. Further, the neural network parameters of the first autoencoder 226 and the second autoencoder 228 are changed or adapted based on the common loss function to increase accuracy in reconstruction.

In one embodiment, the fine-tuning engine 222 is configured to freeze some layers of the first autoencoder 226 and the second autoencoder 228 during the fine-tuning process. For example, some of the encoder layers of both the autoencoders may be frozen so that the neural network parameters of those layers remain unchanged. The purpose of freezing the initial layers of the autoencoders is that, if all the layers are fine-tuned, then the features of the first and second class that are learnt by the autoencoders during the training phase may get biased and/or lost. In one embodiment, the fine-tuning engine 222 may freeze some layers of the encoder only. Similarly, some layers of the decoder layer may also be frozen in some embodiments. In additional embodiments, some layers of both the encoder and decoder may be frozen by the fine-tuning engine 222.

In one embodiment, unlabeled training data is provided to the first autoencoder 226 and the second autoencoder 228. Providing unlabeled training data during the fine-tuning process facilitates the neural network models to learn extra attributes of the first and the second class that were not learnt in the training phase. Since the unlabeled training data was not provided to any of the neural network models in the training phase, attributes associated with the unlabeled training data are unseen by the first autoencoder 226 and the second autoencoder 228. Therefore, some of the unseen features associated with the first and second classes in the training phase will be learnt in the fine-tuning process based on the unlabeled training data.

Further, when the fine-tuning engine 222 stops the fine-tuning process, the first autoencoder 226 and the second autoencoder 228 may be deployed or stored in a database such as the database 204. The first autoencoder 226 and the second autoencoder 228 can be utilized by another model in the database 204 or any entity in the server system 200 to classify edge cases of the first class and the second class.

In one embodiment, one or more threshold reconstruction errors values may be determined by the fine-tuning engine 222 based on the common loss function and the stopping criteria. In an alternate example, only one threshold value may be determined based on optimized reconstruction errors associated with the first autoencoder 226 and the second autoencoder 228. During an execution phase, the edge case classifier 224 is configured to receive an unlabeled data from the data sources 104. The unlabeled data may be new and unseen by the first autoencoder 226 and the second autoencoder 228. The edge case classifier 224 is configured to provide the unlabeled data to the first autoencoder 226 and the second autoencoder 228. The first autoencoder 226 reconstructs the unlabeled data with a first reconstruction error $RE_1$ and the second autoencoder 228 reconstructs the unlabeled data with a second reconstruction error $RE_2$. The edge case classifier 224 is configured to compare both the reconstruction errors $RE_1$ and $RE_2$ with one or more threshold reconstruction errors and classify the unlabeled data either into the first class and the second class.

In an example, the first autoencoder 226 and the second autoencoder 228 may determine the first reconstruction error (e.g., 0.8) and second reconstruction error (e.g., 0.2). The threshold reconstruction error values for the first and the second autoencoder may be 0.6 and 0.4 respectively. The edge case classifier 224 may compare the first reconstruction error (i.e., 0.8) with the threshold reconstruction error value (i.e., 0.6) associated with the first autoencoder 226. Similarly, the edge case classifier 224 may compare the second reconstruction error (i.e., 0.2) with the threshold reconstruction error value (i.e., 0.4) associated with the second autoencoder 228. Since the first reconstruction error is greater than the threshold reconstruction error value associated with the first autoencoder 226 and the second reconstruction error is less than the threshold reconstruction error value associated with the second autoencoder 228, the edge case classifier 224 determines that the unlabeled data belongs to the first class.

In an alternate embodiment, there may be one threshold reconstruction error value determined during the fine-tuning process. The reconstruction errors associated with the first and second autoencoders may be compared with a single threshold reconstruction error value to determine the class to which the unlabeled data belongs. The edge case classifier 224 may then determine to which class the unlabeled data belongs, based on the comparison.

Figure 3:
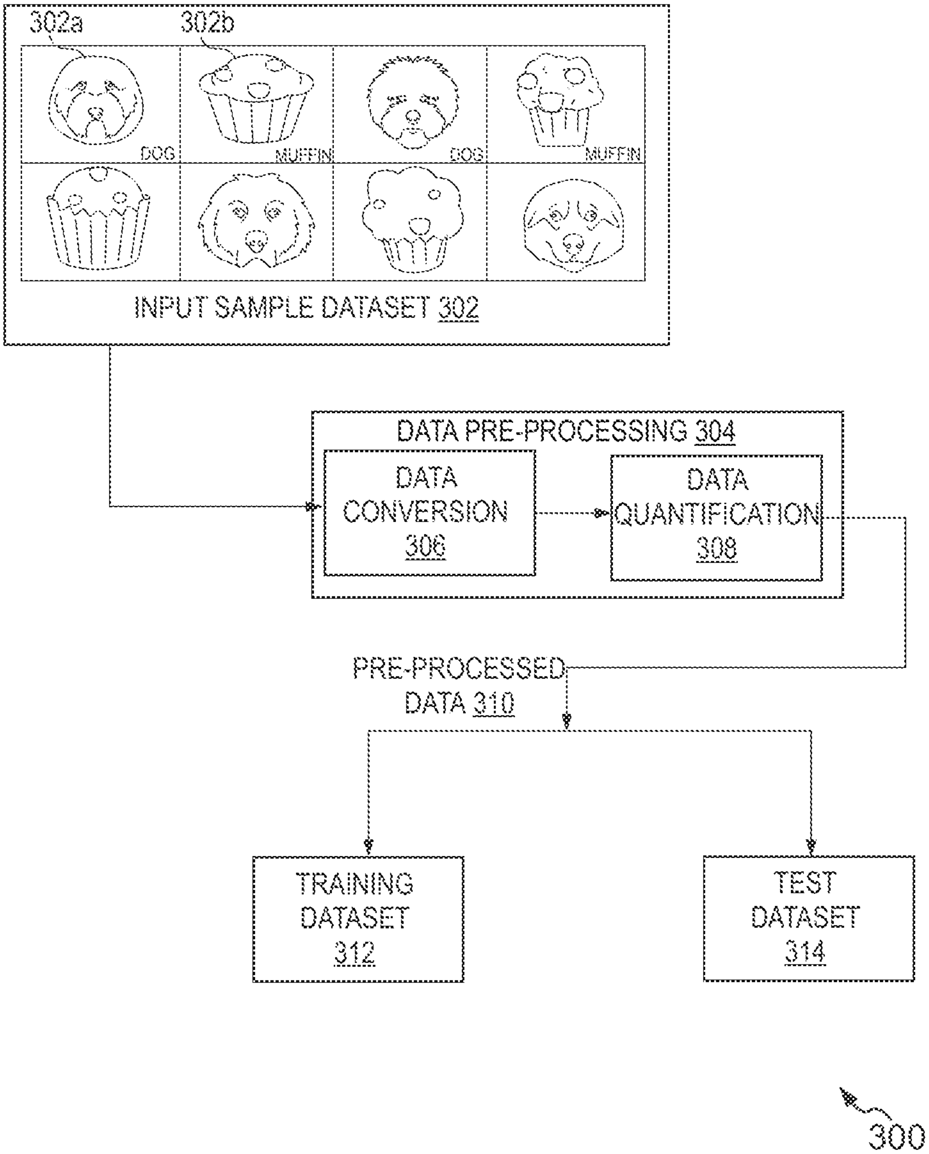
FIG. 3 is a schematic block diagram representation of a process flow for data pre-processing of an input sample dataset, in accordance with an embodiment of the present disclosure.

Referring now to FIG. 3, a schematic block diagram representation 300 of a process flow for data pre-processing of an input sample dataset, is shown, in accordance with an embodiment of the present disclosure.

The processor 206 is configured to access an input sample dataset (see, 302) from the one or more data sources 104 (as shown in FIG. 1).

The input sample dataset 302 may include labeled and unlabeled dataset corresponding to a plurality of classes. In one example, as shown in the FIG. 3, the input sample dataset 302 may include data points of a Chihuahua dog class and a muffin class which are highly similar looking images. In the input sample dataset 302, some of the data points (see, 302*a*) are labelled with the Chihuahua dog class and some of the data points (see, 302*b*) are labelled with a muffin class. The remaining data points are unlabeled data points which are not labelled or annotated. Since top view images corresponding to the Chihuahua dog class and the muffin class look very similar in design, therefore, the input sample dataset 302 include many edge cases corresponding to both the classes which are not able to classify using a conventional classification model.

As the model training engine 220 and the fine-tuning engine 222 are configured to deal with two classes for once, only two classes are considered for the explanation. It should be noted that a combination of all the pairs of the plurality of classes can be used to train the multiple autoencoders.

The data pre-processing engine 218 is configured to extract the first labeled training data (see, 302*a*) corresponding to the first class, second labeled training data (see, 302*b*) corresponding to the second class and unlabeled training data. Further, the data corresponding to both the classes is pre-processed to make the data suitable to be given to neural network models as input.

In one embodiment, during the data pre-processing (see, 304), the first and second labeled training data and unlabeled training data go through data conversion process (see, 306). The data conversion includes converting the data into a simplified state such as removing special characters and numeric values and converting the whole text data into lowercase. Another example of data conversion includes converting an image into a matrix form by dividing the image into a number of pixels and expressing the pixels in the form of a matrix.

Further, the first and second labeled training data and the unlabeled training data are quantified by performing data quantification (see, 308). The data quantification may involve scaling and expressing the data into a scalable format. The data quantification may involve multiplying or dividing all the numeric values in the dataset using a same number so as to scale the values in the dataset into more efficient and easier values. The data quantification provides a sense of numerical weights to all the data points in the first and second labeled training data and the unlabeled training data.

A pre-processed data (see, 310) may be obtained based on the data pre-processing process. In one embodiment, before providing the pre-processed data to the neural network models, the data pre-processing engine 218 is configured to split the pre-processed data into training dataset (see, 312) and a test dataset (see, 314). The training set is used to train and fine tune the first autoencoder 226 and the second autoencoder 228. The test dataset is used to test the performance of the first autoencoder 226, and the second autoencoder 228 during the training process.

Figure 4A:
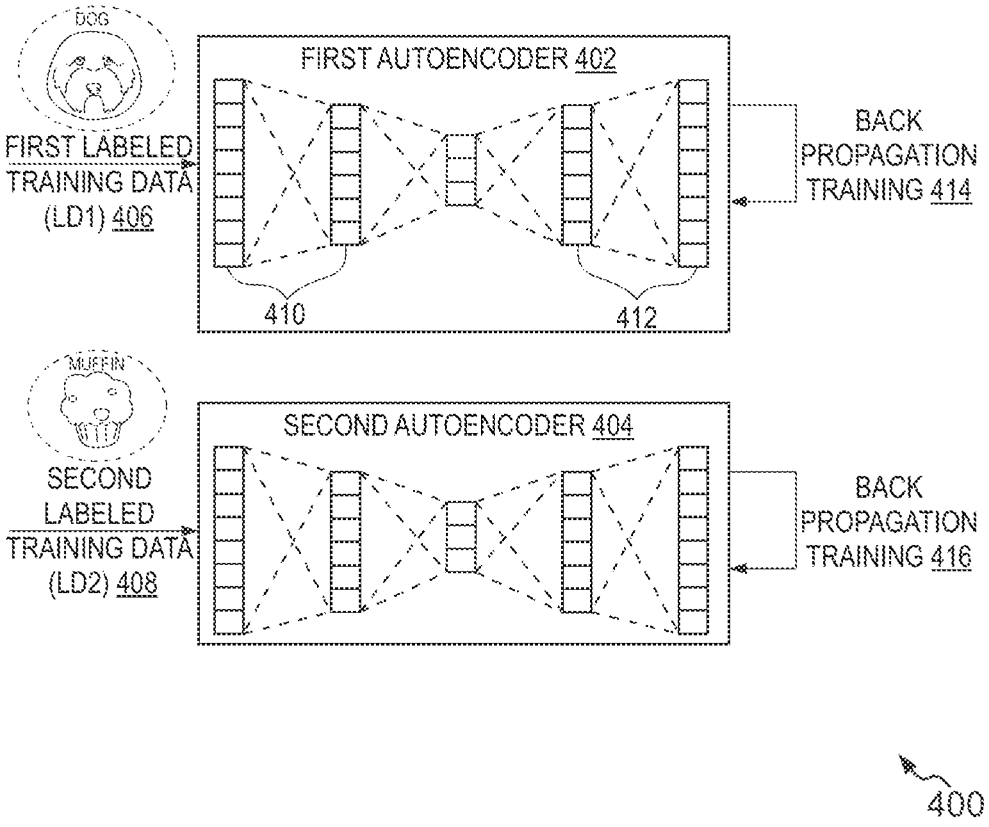
FIG. 4A is a schematic representation of an initial training process of a first autoencoder and a second autoencoder, in accordance with an example embodiment of the present disclosure.

FIG. 4A is a schematic representation 400 of an initial training process of first autoencoder and the second autoencoder, in accordance with an example embodiment of the present disclosure. As mentioned above, the processor 206 is configured to utilize a first autoencoder 402 and a second autoencoder 404 for classifying edge cases of highly similar binary classes (e.g., first class C1 and second class C2). As shown in the FIG. 4A, in one example, the first class C1 represents Chihuahua dog class and the second class C2 represents a muffin class.

In the initial training process, the processor 206 is configured to provide the first labeled training data LD1 406 associated with a first class C1 to the first autoencoder 402 for learning data features of the first class C1. The processor 206 is configured to provide second labeled training data LD2 408 associated with the second class C2 to the second autoencoder 404 for learning data features of the second class C2.

The first autoencoder 402 may include an encoder stage 410 including one or more encoder layers and a decoder stage 412 including one or more decoder layers. The encoder stage 410 may receive an input vector x and map it to a latent representation Z, the dimension of which is significantly less than the input vector, and it can be represented as following equation:

$$Z=\sigma(Wx+b) \qquad \text{Eqn. (1)}$$

where σ is an activation function that may be represented by a sigmoid function or a rectifier linear unit, W is a weight matrix, and b is a bias vector.

The decoder stage 412 of the first autoencoder 402 may map the latent representation Z to reconstruction vector x' having the same dimension as the input vector x as provided in following equation:

$$x'=\sigma'(W'Z'+b') \qquad \text{Eqn. (2)}$$

The first autoencoder 402 may be trained to minimize the reconstruction error defined by the following equation:

$$L(x,x')=\|x-x'\|^2 \qquad \text{Eqn. (3)}$$

In above Equation (3), x may be averaged over the first labeled training data. The first autoencoder 402 is configured to initialize first neural network parameters (such as, weights) randomly and adjust the first neural network parameters to minimize the reconstruction error L(x,x') through a back-propagation process 414.

Similarly, the second autoencoder 404 is also configured to initialize second neural network parameters (such as, weights) randomly and adjust the second neural network parameters to minimize a reconstruction error L(x,x') through a back-propagation process 416.

In an illustrative example, the loss function L(x,x') may be represented by the binary cross-entropy function. The training process may be repeated until the output error is below a predetermined threshold.

In one embodiment, the first autoencoder 402 and the second autoencoder 404 may be represented by a feed-forward, non-recurrent neural networks, recurrent neural networks, etc. In one example, the type of the first autoencoder 402 and the second autoencoder 404 may be determined based on the type of datasets that have to be classified.

Figure 4B:
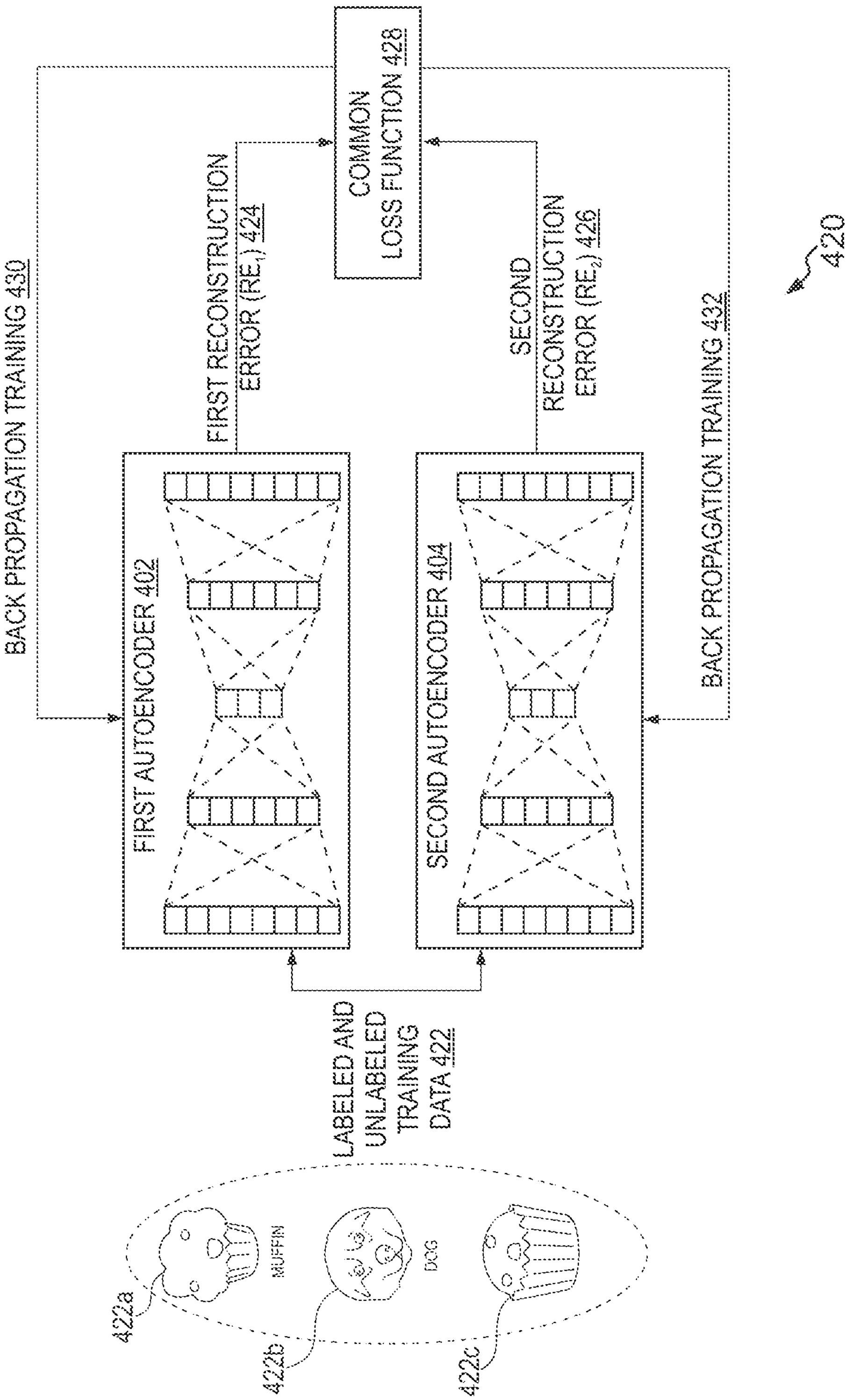
FIG. 4B is a schematic representation of a fine-tuning process of the first autoencoder and the second autoencoder, in accordance with an example embodiment of the present disclosure.

FIG. 4B, in conjunction with the FIG. 4A, is a schematic representation 420 of a fine-tuning process of the first autoencoder and the second autoencoder, in accordance with an embodiment of the present disclosure.

As mentioned previously, once the first autoencoder 402 and the second autoencoder 404 are trained based on the first labeled training data LD1 406 of the first class and the second labeled training data LD2 408 of the second class, the processor 206 is configured to fine-tune the first autoencoder 402 and the second autoencoder 404 to maximize difference in learning of the first and second autoencoders such that the edge cases can be classified correctly.

In other words, the fine-tuning process maximizes a difference between the reconstruction errors of the first and second autoencoders to make sure that data features belonging to one class are learnt by only one of the autoencoders and completely unlearnt by the other autoencoder.

The first autoencoder 402 and the second autoencoder 404 are fed with labeled training data and unlabeled training data 422 associated with either the first class or the second class. As shown in the FIG. 4B, the labeled training data may include muffin image 422*a* and dog image 422*b*. The unlabeled training data is shown as an image 422*c* which is not used an input during the training process.

The usage of unlabeled training data during the fine-tuning process facilitates neural network models of the first and second autoencoders to learn extra attributes of the first and the second class that were not learnt in the training process. Since the unlabeled training data was not provided to any of the neural network models in the training phase, attributes associated with the unlabeled training data are unseen by the first autoencoder 402 and the second autoencoder 404. Therefore, some of the unseen features associated with the first and second classes are learnt in the fine-tuning process using the unlabeled training data which makes the fine-tuning process unsupervised.

The processor 206 is configured to determine a first reconstruction error $RE_1$ (see, 424) based on the output of the first autoencoder 402 and a second reconstruction error $RE_2$ (see, 426) based on the output of the second autoencoder 404.

Thereafter, the processor 206 is configured to compute a common loss function 428 based on a combination of the first reconstruction error $RE_1$ and the second reconstruction error $RE_2$. In particular, the common loss function 428 is defined as a difference between reconstruction errors of the first autoencoder 402 and the second autoencoder 404 i.e., $|RE_1-RE_2|$. The processor 206 is then configured to train the first autoencoder 402 and the second autoencoder 404 based on the common loss function 428 through back-propagation processes (see, 430 and 432).

In every epoch (iteration), the neural network parameters of the first and second autoencoders are adjusted. The fine-tuning process may stop when the distance between the first and second reconstruction errors is maximized to a predetermined threshold value.

In one example, the common loss function may be a negative value of the difference between categorical cross entropies of predictions from the first autoencoder 402 and the second autoencoder 404. In another example embodiment, the common loss function can be a negative of the difference of summation of predicted probability of correct classes of predictions from the first autoencoder and the second autoencoder.

In one example, the common loss function may be negative of the difference between categorical cross entropies of predictions from the first autoencoder 402 and the second autoencoder 404. The common loss function can be represented using the following equation:

$$\text{Loss}=-|(-\Sigma_{first}y \log p)-(-\Sigma_{second}y \log p)| \quad \text{Eqn. (4)},$$

where $\Sigma_{first}y \log p$ denotes summation of cross entropy value determined based on the output of the first autoencoder 402, and $\Sigma_{second}y \log p$ denotes summation of cross entropy value determined based on the output of the second autoencoder 404.

In another example, the common loss function can be negative of the difference of summation of predicted probability of correct classes of predictions from the first autoencoder 402 and the second autoencoder 404. The common loss function can be represented using the following equation:

$$\text{Loss}=-|(-\Sigma_{first}y\ p)-(-\Sigma_{second}y\ p)| \quad \text{Eqn. (5)},$$

where $\Sigma_{first}y$ p denotes summation of predicted probability of the first class and $\Sigma_{second}y$ p denotes summation of predicted probability of the second class.

In one embodiment, the processor 206 is configured to freeze some encoder layers of the first autoencoder 402 and the second autoencoder 404 during the fine-tuning process. Freezing some of the encoder layers does not affect the data features learnt by the encoder and decoder layers during the training process. The purpose of freezing the initial layers of the autoencoders is that, if all the layers are fine-tuned then the features of the first and second class that are learnt by the autoencoders during the training phase may get biased and/or lost.

For example, when a classification model is fine-tuned to classify an image into a Chihuahua or a muffin which look highly similar, CNN based autoencoders may be used. In the example, the first two encoder layers of both the CNN based autoencoders may be frozen so that the neural network parameters of the first two encoder layers remain unchanged during the fine-tuning process. In one embodiment, the processor 206 may freeze some layers of the encoder iteself. Similarly, some layers of the decoder layers themselves may also be frozen. In alternate embodiments, some layers of both the encoder and decoder may be frozen by the processor 206.

Figure 5:
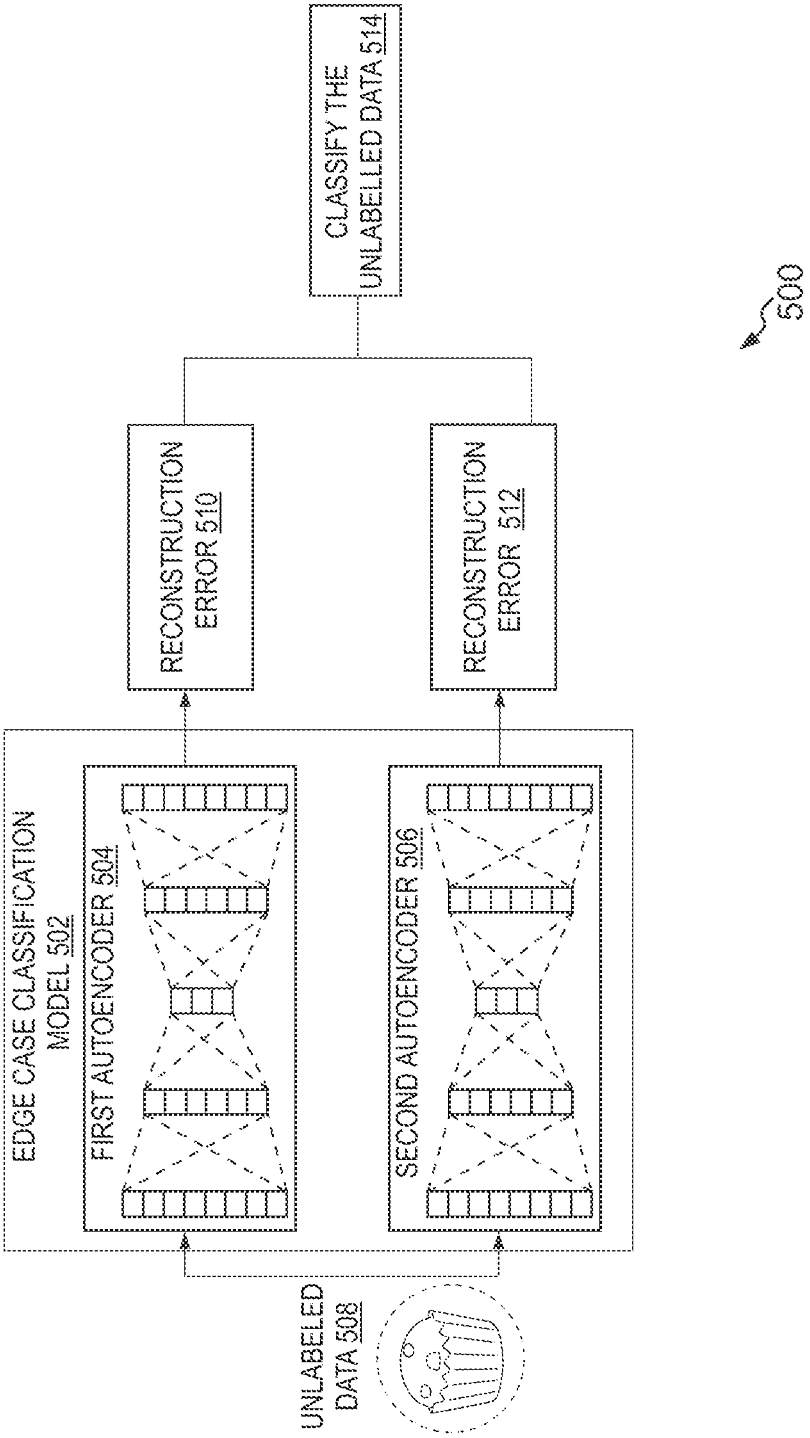
FIG. 5 is a schematic representation of an edge case classification model, in accordance with an example embodiment of the present disclosure.

FIG. 5 is a schematic representation 500 of an edge case classification model, in accordance with an example embodiment of the present disclosure. The edge classification model 502 may include a first autoencoder 504 and a second autoencoder 506. The first autoencoder 502 and the second autoencoder 504 are fine-tuned such that the edge cases can be classified into either the first class (e.g., Chihuahua dog class) or the second class (e.g., muffin dog class).

During an execution or classification phase, the processor 206 is configured to provide an unlabeled data (see, 508) to the first autoencoder 504 and the second autoencoder 506. The unlabeled data may be new and unseen by the first autoencoder 504 and the second autoencoder 506.

Both the autoencoders encode the unlabeled data 508 using encoder layers and try to reconstruct the output using decoder layers. The processor 206 is configured to determine the first reconstruction error 510 and the second reconstruction error 512 for the corresponding unlabeled data. In one embodiment, the processor 206 is configured to compare both the reconstruction errors with one or more threshold reconstruction error values and determine the class to which the unlabeled data belongs to (see, 514).

In an example, when the edge case classification model is provided with an unlabeled image to classify the unlabeled image into a Chihuahua or a muffin which look highly similar, the edge case classification model may pass the unlabeled image to both the autoencoders 504 and 506. The first autoencoder 504 may generate a reconstruction error Rc associated with the Chihuahua class and the second autoencoder 506 may generate a reconstruction error Rm associated with the muffin class. The reconstruction errors Rc and Rm may then be passed through the edge case classification model 502 to determine the class to which the unlabeled data belongs. In the example, the first autoencoder 504 and the second autoencoder 506 may determine the reconstruction errors Rc and Rm to be 0.3 and 0.9, respectively. The threshold reconstruction error values for the first and the second autoencoders may be 0.7 and 0.4 respectively.

The edge case classification model 502 may compare the reconstruction error Rc (i.e., 0.3) with the threshold reconstruction error value associated with the first autoencoder 504 (i.e., 0.7). Similarly, the reconstruction error Rm (i.e., 0.9) may be compared with the threshold reconstruction error value associated with the second autoencoder (i.e., 0.4). Since Rc is lesser than the threshold reconstruction error value associated with the first autoencoder 504 and Rin is greater than the threshold reconstruction error value associated with the second autoencoder 506, the edge case classification model 502 may determine that the unlabeled image belongs to the muffin class.

In an alternate embodiment, there may be only one threshold reconstruction error value determined during the fine-tuning process. The reconstruction errors associated with the first autoencoder 504 and the second autoencoder 506 may be compared with a single threshold reconstruction error value. The edge case classification model 502 may determine based on the comparison, to which class the unlabeled data belongs.

Figure 6:
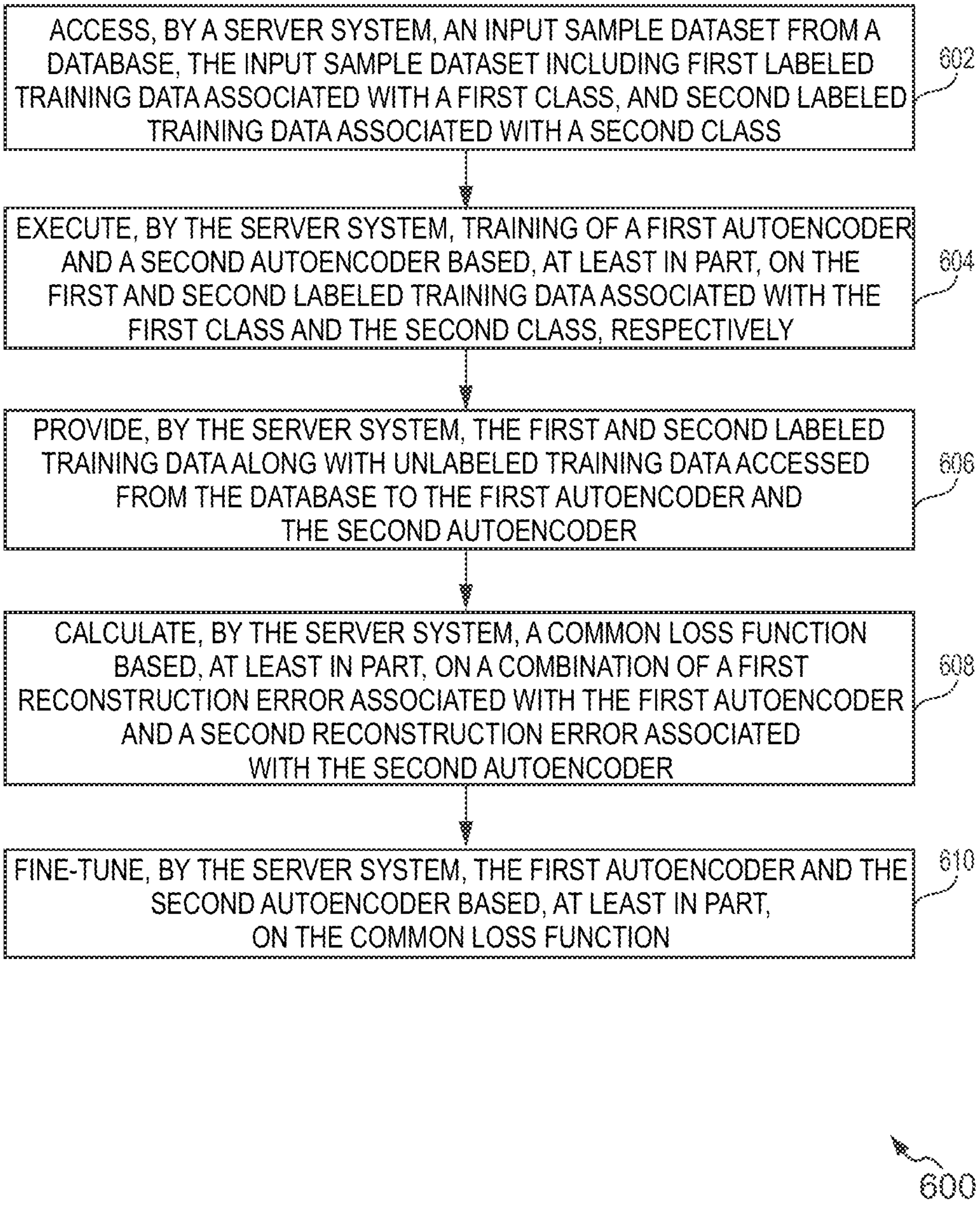
FIG. 6 is a computer-implemented method for training and fine-tuning process of the first autoencoder and the second autoencoder, in accordance with an example embodiment of the present disclosure.

FIG. 6 represents a flow diagram of a computer-implemented method 600 for training and fine-tuning process of the first autoencoder and the second autoencoder, in accordance with an embodiment of the present disclosure. The method 600 depicted in the flow diagram may be executed by the server system 200 which may be standalone server or a server as whole incorporated in another server system. Operations of the method 600, and combinations of operation in the method 600, may be implemented by, for example, hardware, firmware, a processor, circuitry and/or a different device associated with the execution of software that includes one or more computer program instructions.

In certain implementations, the method 600 may be performed by a single processing thread. Alternatively, the method 600 may be performed by two or more processing threads, each processing thread implementing one or more individual functions, routines, subroutines, or operations of the method. In an illustrative example, the processing threads implementing the method 600 may be synchronized (e.g., using semaphores, critical sections, and/or other thread synchronization mechanisms). Alternatively, the processing threads implementing the method 600 may be executed asynchronously with respect to each other. The method 600 starts at operation 602.

At 602, the method 600 includes accessing, by a server system 102, an input sample dataset from a database. The input sample dataset may include first labeled training data associated with a first class, and second labeled training data associated with a second class.

At 604, the method 600 includes executing, by the server system 102, training of a first autoencoder 226 and a second autoencoder 228 based, at least in part, on the first and second labeled training data associated with the first class and the second class, respectively.

At 606, the method includes providing, by the server system 102, the first and second labeled training data along with unlabeled training data accessed from the database to the first autoencoder 226 and the second autoencoder 228. At once, a data point of the same labeled training data or the unlabeled training data belonging to either first class or the second class is Liven to both the autoencoders. This step is performed for all the data points present in the sample dataset.

At 608, the method includes calculating, by the server system 102, a common loss function based, at least in part, on a combination of a first reconstruction error associated with the first autoencoder 226 and a second reconstruction error associated with the second autoencoder 228. In one example embodiment, the common loss function may be defined as a negative of the difference between the first and the second reconstruction errors.

At 610, the method includes fine-tuning, by the server system 102, the first autoencoder 226 and the second autoencoder 228 based, at least in part, on the common loss function. Fine-tuning refers to the refining of the neural network parameters such as the weights and biases of the first and second autoencoders.

Figure 7:
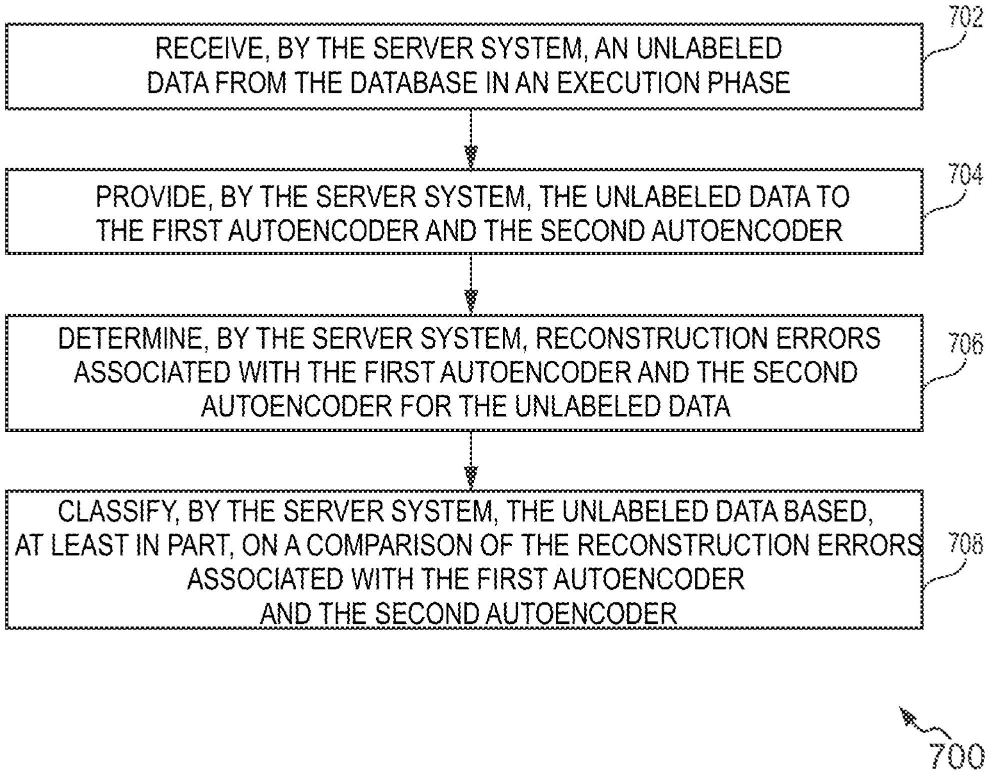
FIG. 7 a flow diagram of classifying edge cases using neural network models, in accordance with an example embodiment of the present disclosure.

FIG. 7 represents a flow diagram 700 of classifying edge cases using neural network models (i.e., autoencoders), in accordance with an example embodiment of the present disclosure. The process flow depicted in the flow diagram 700 may be performed by, for example, a server system such as the server system 200. Operations of the process flow, and combinations of operation in the method may be implemented by, for example, hardware, firmware, a processor, circuitry, and/or a different device associated with the execution of software that includes one or more computer program instructions. The process flow starts at operation 702.

As described earlier, during the execution phase, an unlabeled data is received by the server system 200 from one of the data sources 104. The unlabeled data may be new and unseen by the first and second autoencoders during the training phase. The data pre-processing engine 218 is configured to generate a quantified unlabeled data that is suitable to be provided to the autoencoders. The edge case classifier 224 is configured to receive the quantified unlabeled data from the data pre-processing engine 218 and provide the quantified unlabeled data to both the autoencoders.

The first autoencoder 226 and the second autoencoder 228 are configured to determine a first reconstruction error R1 and a second reconstruction error R2 for the quantified unlabeled data. The edge case classifier 224 is further configured to provide the first reconstruction error R1 and the second reconstruction error R2 to the edge case classifier 224 to classify the unlabeled data into the first class or second class. The edge case classifier 224 is configured to compare both the reconstruction errors with one or more threshold reconstruction error values and determine the class which the unlabeled data belongs to.

In an example embodiment, the edge case classifier 224 may compare the first reconstruction error R1 with a threshold reconstruction error value and the second reconstruction error R2 with another threshold reconstruction error value. If the first reconstruction error R1 is greater than the threshold reconstruction error value and the second reconstruction error R2 is lesser than the other threshold reconstruction error value, the edge case classifier 224 may determine that the unlabeled data belongs to the first class.

At 702, the server system 200 receives an unlabeled data from the database such as one of the data sources 104, in the execution phase. The unlabeled data may be unseen by the first and second autoencoders during the training and fine-tuning phases. The unlabeled data may belong to only one out of the two classes but may be highly similar to the other class to which it does not belong. The first and second autoencoders are trained in such a way that the unlabeled data will be classified into only one class to which it belongs.

At 704, the server system 200 provides the unlabeled data to the first autoencoder and the second autoencoder. The server system 200 determines reconstruction errors based on the output of the first and second autoencoders.

At 706, the server system 200 determines reconstruction errors associated with the first and second autoencoders based on the unlabeled data provided to both the autoencoders as an input. In one embodiment, based on the training and the fine-tuning of the autoencoders, if one autoencoder learns features of one class, the other autoencoder completely unlearns the features of that class. This is achieved by maximizing the difference between the first and second reconstruction errors.

At 708, the server system 200 classifies the unlabeled data based on the comparison of the reconstruction errors associated with the first and second autoencoders with one or more threshold reconstruction error values. In an embodiment, when the reconstruction error associated with the second autoencoder is greater than a certain threshold reconstruction error value and the reconstruction error associated with the first autoencoder is lesser than a certain threshold reconstruction error value, the server system 200 may determine that the unlabeled data belongs to the second class.

The sequence of operations of the method 700 need not to be necessarily executed in the same order as they are presented. Further, one or more operations may be grouped together and performed in form of a single step, or one operation may have several sub-steps that may be performed in parallel or in sequential manner.

The present disclosure can be implemented at various practical application areas for classifying the edge cases of classes with similar properties/characteristics. The various practical application areas may include, but not limited to, anomaly detection in server logs, identification of synthetic merchants, identification fraud payment transactions, customer attrition identification, phishing classification, merchant classification, etc.

Figure 8:
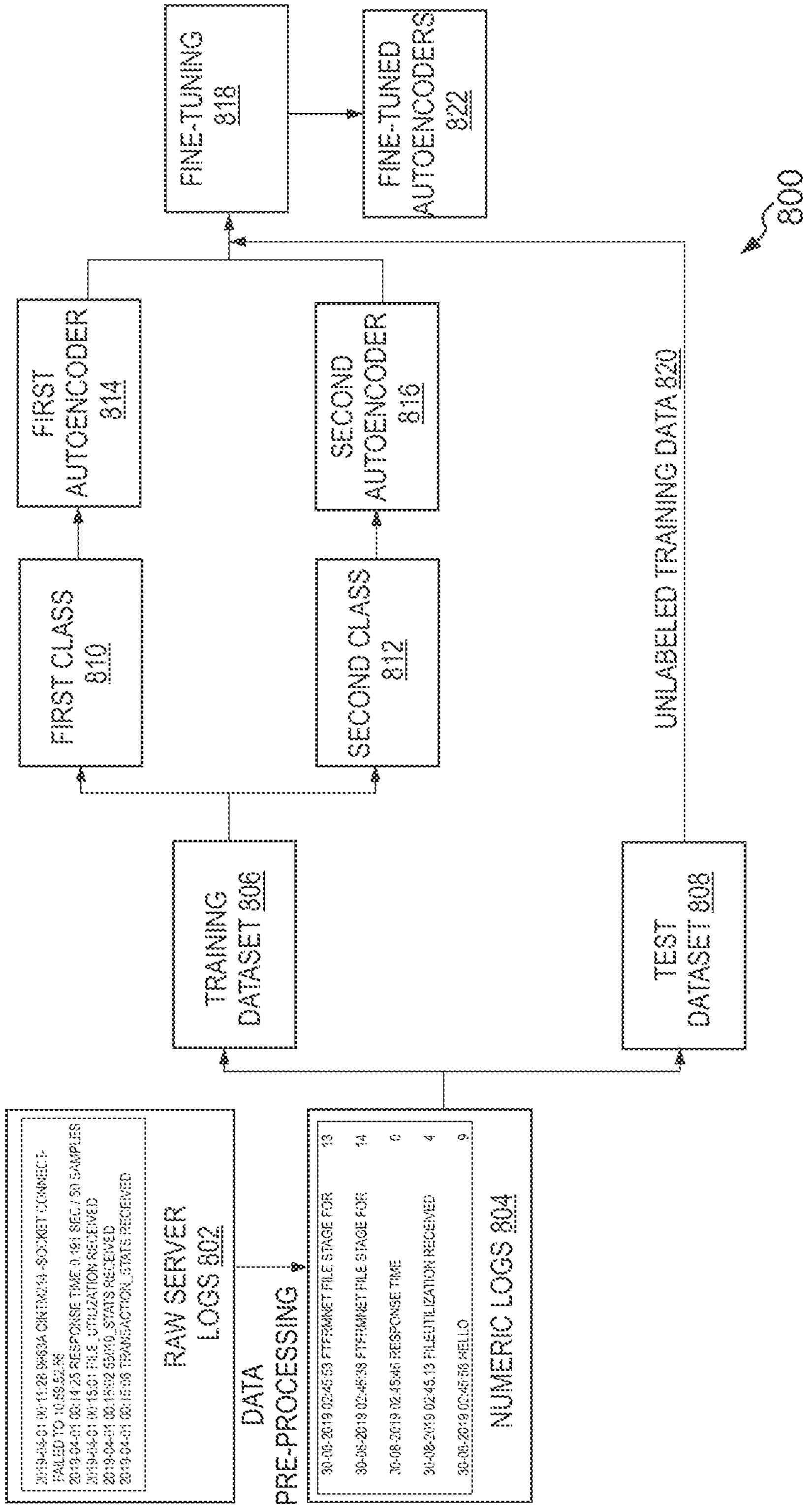
FIG. 8 is a schematic representation of classification of healthy and unhealthy server logs, in accordance with an example embodiment of the present disclosure.

FIG. 8 is a schematic representation 800 of classification of healthy and unhealthy server logs, in accordance with an example embodiment of the present disclosure. In one embodiment, the technology described in the present disclosure may be used to classify a particular sequence of logs as healthy server logs or failure server logs. The failure or unhealthy server logs indicate that a server may fail in future and classifying the server logs help in predicting the failure of the server well before the failure occurs. In general, the similarities between the healthy and unhealthy server logs make it difficult for a normal classification model to differentiate between the healthy and unhealthy server logs. An autoencoder is utilized to learn the features of healthy server logs and the other autoencoder is utilized to learn the features of unhealthy server logs.

In the schematic representation 800, raw server logs (see, 802) are exemplarily shown. The server logs may be accessed form a database based on a history of server logs. In one embodiment, the server system 200 may access the raw server logs form one or more data sources 104 (As shown in FIG. 1). The raw server logs may then be pre-processed using suitable data pre-processing techniques. The processor 206 is configured to generate quantified data using the data accessed from the data sources. The raw server logs is pre-processed by transferring to lowercase and removing special characters and numbers. The logs are then clustered into a number of clusters by converting word to vectors and using a Word2Vec model followed by a clustering algorithm such as the K-Nearest Neighbour clustering. The raw server logs may be clustered into a group of numeric logs (see, 804).

The numeric logs may then be split into two data sets, such as training dataset (see, 806) and test dataset (see, 808). The training data set may include labeled training data. The labeled training data may be used in the training of the first and second autoencoders. Further, the test dataset includes unlabeled training data that will be used along with the labeled training data to perform fine-tuning of the first and second autoencoders.

The training dataset including the labeled training data may be split into two sets of data. One set of data may include data points associated with a first class (see, 810) i.e., healthy server logs and another set of data may include data points associated with a second class (see, 812) i.e., unhealthy server logs. The set of data associated with the healthy server logs may be provided to a first autoencoder (see, 814) and the set of data associated with the unhealthy server logs may be provided to a second autoencoder (see, 816).

In one example, the first and second autoencoders may be LSTM based sequential autoencoders, which consist of an encoder-decoder LSTM framework with back propagation.

The first autoencoder 814 may be trained to learn the features of the healthy server logs. The encoder layers of the first autoencoder 814 may be configured to encode the input data into a simplified format and the decoder layers are configured to reconstruct the input. A reconstruction error may be determined based on the reconstructed input and the neural network parameters may be updated and adjusted using back propagation in order to make the reconstructed output to be similar to the input. The first autoencoder 814 may be trained in iterations by optimizing neural network parameters to reduce the reconstruction error. Once the first autoencoder is able to reconstruct the input accurately, the iterations may be stopped.

Similarly, the second autoencoder 816 may be trained to learn the features of the unhealthy server logs. The encoder layers may be trained to encode the input and the decoder layers may reconstruct the encoded input and a reconstruction error may be determined. The neural network parameters may be adjusted based on the reconstruction error and a number of iterations are performed until the second autoencoder has reached an optimised reconstruction error and has learnt the features of the failure or unhealthy server logs.

After the first and second autoencoders are trained, fine-tuning (see, 818) of the autoencoders is performed.

In the fine-tuning process, the processor 206 is also configured to utilize unlabeled training data 820 along with the labelled data for fine-tuning the first autoencoder 814 and the second autoencoder 816. A first reconstruction error may be determined by the first autoencoder 814. A second reconstruction error is determined by the second autoencoder 816. A common loss function may be defined for the autoencoders such that the distance between the first reconstruction error and the second reconstruction error is maximized.

During the fine-tuning process, some data points in the test dataset may also be provided to the first and second autoencoders as a part of fine-tuning (see, 818). This facilitates the autoencoders to learn extra attributes associated with the healthy and unhealthy server logs. Further, after the fine-tuning process is finished, one or more threshold reconstruction error values may be determined based on the loss function and the optimized first and second reconstruction errors.

The fine-tuned autoencoders 822 may then be deployed in any database such as the database 204 and may be utilized to classify a new and unseen server long received from any data source as healthy server log or unhealthy server log.

Since the log sequences are very similar for failed and healthy states of the server, in this scenario, it is difficult to correctly differentiate between the two states. As it is visible, the present disclosure offers a major improvement in both precision and recall. The below tables depict some results of comparison between the performance of an existing classification model and the proposed classification model on the test dataset.

TABLE 1

| | Actual | |
|---|---|---|
| | Healthy | Failure |
| Existing classification model: | 2756 | 2382 |
| Predicted as failure | 131 | 576 |

TABLE 2

| | Actual | |
|---|---|---|
| | Healthy | Failure |
| Proposed edge case classification model: | 2884 | 1965 |
| Predicted as failure | 3 | 993 |

As it is understood from the tables 1 and 2 that the proposed solution gives a major lift in recall and precision values (i.e., recall: 33.5% and precision: 99.7%) of the proposed edge case classification model compared to recall and precision values (i.e., recall: 19.5% and precision: 81.4%) of the existing classification model. The proposed technology is able to capture many more failures while reducing the false positives. This is indicative of the performance boost in the proposed technology compared to the existing technology.

The disclosed methods 600 and 700 with reference to FIGS. 7 and 8 or one or more operations of the server system 200 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the server system 200 and its various components may be enabled using software and/or using transistors, logic gates, and electrical circuits (for example, integrated circuit circuitry such as ASIC circuitry). Various embodiments of the invention may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Various embodiments of the invention, as discussed above, may be practiced with steps and/or operations in a different order, and/or with hardware elements in configurations that are different than those which, are disclosed. Therefore, although the invention has been described based upon these exemplary embodiments, it is noted that certain modifications, variations, and alternative constructions may be apparent and well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

We claim:

1. A computer-implemented method, comprising:

accessing, by a server system, an input sample dataset from a database, the input sample dataset comprising first labeled training data associated with a first class, and second labeled training data associated with a second class;

executing, by the server system, training of a first autoencoder and a second autoencoder based, at least in part, on the first and second labeled training data associated with the first class and the second class, respectively; and fine-tuning, by the server system, the first autoencoder and the second autoencoder by providing the first and second labeled training data along with unlabeled training data accessed from the database to the first autoencoder and the second autoencoder as an input;

computing a first reconstruction error associated with the first autoencoder based on the input;

computing a second reconstruction error associated with the second autoencoder based on the input;

calculating a common loss function based, at least in part, on a difference between the first reconstruction error and the second reconstruction error; and increasing the difference by adjusting neural network parameters of the first and second autoencoders.

2. The computer-implemented method as claimed in claim 1, wherein executing the training of the first autoencoder and the second autoencoder further comprises:

determining, by the server system, first neural network parameters of the first autoencoder based, at least in part on, the first labeled training data of the first class; and determining, by the server system, second neural network parameters of the second autoencoder based, at least in part on, the second labeled training data of the second class.

3. The computer-implemented method as claimed in claim 1, wherein the first autoencoder and the second autoencoder are configured to create an edge case classification model configured to differentiate edge cases of the first and second classes.

4. The computer-implemented method as claimed in claim 1, wherein the increasing the difference is performed through a back-propagation such that the difference of the first reconstruction error and the second reconstruction error is maximized to a predetermined threshold value.

5. The computer-implemented method as claimed in claim 1, wherein the first and second autoencoders are configured to differentiate edge cases of the first class and the second class.

6. The computer-implemented method as claimed in claim 1, wherein the providing of the unlabeled training data to the first autoencoder and the second autoencoder facilitates training of the first autoencoder and the second autoencoder in a discriminative manner to learn data characteristics associated with the unlabeled training data.

7. The computer-implemented method as claimed in claim 1, further comprising:

receiving, by the server system, an unlabeled data from the database to be classified;

providing, by the server system, the unlabeled data to the first autoencoder and the second autoencoder;

determining, by the server system, third reconstruction errors associated with the first autoencoder and the second autoencoder for the unlabeled data; and classifying, by the server system, the unlabeled data based, at least in part, on a comparison of the third reconstruction errors associated with the first autoencoder and the second autoencoder.

8. The computer-implemented method as claimed in claim 7, wherein classifying the unlabeled data comprises comparing the third reconstruction errors associated with the first autoencoder and the second autoencoder with one or more threshold reconstruction error values.

9. A server system comprising:

a memory for storing instructions;

a communication interface; and at least one processor for executing the instructions to cause the server system to:

access, via the communication interface, a sample dataset from a database of a remote device, the sample dataset comprising first labeled training data associated with a first class and a second labeled training data associated with a second class;

execute training of a first autoencoder and a second autoencoder based, at least in part, on the first and second labeled training data associated with the first class and the second class, respectively; and fine-tune the first autoencoder and the second autoencoder by providing the first and second labeled training data along with unlabeled training data accessed from the database to the first autoencoder and the second autoencoder as an input;

computing a first reconstruction error associated with the first autoencoder based on the input;

computing a second reconstruction error associated with the second autoencoder based on the input;

calculating a common loss function based, at least in part, on a difference between the first reconstruction error and the second reconstruction error; and increasing the difference by adjusting neural network parameters of the first and second autoencoders.

10. The server system as claimed in claim 9, wherein the executing the training of the first autoencoder and the second autoencoder further comprises:

determining, by the server system, first neural network parameters of the first autoencoder based, at least in part on, the first labeled training data of the first class; and determining, by the server system, second neural network parameters of the second autoencoder based, at least in part on, the second labeled training data of the second class.

11. The server system as claimed in claim 9, wherein the first autoencoder and the second autoencoder are configured to create an edge case classification model configured to differentiate edge cases of the first and second classes.

12. The server system as claimed in claim 9, wherein the increasing the difference is performed through a back-propagation such that the difference of the first reconstruction error and the second reconstruction error is maximized to a predetermined threshold value.

13. The server system as claimed in claim 9, wherein the first and second autoencoders are configured to differentiate edge cases of the first class and the second class.

14. The server system as claimed in claim 9, wherein the the providing of the unlabeled training data to the first autoencoder and the second autoencoder facilitates training of the first autoencoder and the second autoencoder in a discriminative manner to learn data characteristics associated with the unlabeled training data.

15. The server system as claimed in claim 9, wherein the at least one processor executes the instructions to further cause the server system to:

receive an unlabeled data from the database to be classified;

provide the unlabeled data to the first autoencoder and the second autoencoder;

determine third reconstruction errors associated with the first autoencoder and the second autoencoder for the unlabeled data; and classify the unlabeled data based, at least in part, on a comparison of the third reconstruction errors associated with the first autoencoder and the second autoencoder.

16. The server system as claimed in claim 15, wherein to classify the unlabeled data, the at least one processor executes the instructions to compare the third reconstruction errors associated with the first autoencoder and the second autoencoder with one or more threshold reconstruction error values.

17. A computer program product comprising at least one non-transitory computer-readable storage medium, the computer-readable storage medium comprising a set of instructions, which, when executed by one or more processors in an electronic device, cause the electronic device to at least:

access a sample dataset from a database of a remote device, the sample dataset comprising first labeled training data associated with a first class and a second labeled training data associated with a second class;

execute training of a first autoencoder and a second autoencoder based, at least in part, on the first and second labeled training data associated with the first class and the second class, respectively; and fine-tune the first autoencoder and the second autoencoder by providing the first and second labeled training data along with unlabeled training data accessed from the database to the first autoencoder and the second autoencoder as an input;

computing a first reconstruction error associated with the first autoencoder based on the input;

computing a second reconstruction error associated with the second autoencoder based on the input;

calculating a common loss function based, at least in part, on a difference between the first reconstruction error and the second reconstruction error; and increasing the difference by adjusting neural network parameters of the first and second autoencoders.

18. The computer program product as claimed in claim 17, wherein the executing the training of the first autoencoder and the second autoencoder further comprises the computer-readable storage medium, when executed by the one or more processors in the electronic device, causing the electronic device to at least:

determine first neural network parameters of the first autoencoder based, at least in part on, the first labeled training data of the first class; and determine second neural network parameters of the second autoencoder based, at least in part on, the second labeled training data of the second class.

* * * * *